US006863426B2

(12) United States Patent
Delourme

(10) Patent No.: US 6,863,426 B2
(45) Date of Patent: Mar. 8, 2005

(54) REFLECTOR DEVICE FOR AUTOMOBILE VEHICLE HEADLIGHT

(75) Inventor: Jean-François Delourme, Meslin l'Eveque (BE)

(73) Assignee: Valeo Vision (FR)

( * ) Notice: Subject to any disclaimer, the term of this patent is extended or adjusted under 35 U.S.C. 154(b) by 14 days.

(21) Appl. No.: 10/635,286

(22) Filed: Aug. 6, 2003

(65) Prior Publication Data

US 2004/0027835 A1 Feb. 12, 2004

(30) Foreign Application Priority Data

Aug. 8, 2002 (FR) ........................................... 02 10126

(51) Int. Cl.[7] ............................ B60Q 1/00; B60Q 1/26; B60Q 1/32; B60Q 11/00; B60Q 3/00

(52) U.S. Cl. ....................... 362/507; 362/487; 362/538; 362/540; 362/547; 362/548; 362/549; 362/373; 362/226

(58) Field of Search ................................. 362/507, 487, 362/538, 540, 547, 548, 549, 373, 226

(56) References Cited

U.S. PATENT DOCUMENTS 5,158,350 A * 10/1992 Sato ........................... 362/538
5,199,779 A * 4/1993 Sato ........................... 362/538
5,353,204 A * 10/1994 Kawamura .................. 362/538

* cited by examiner

*Primary Examiner*—Stephen Husar
*Assistant Examiner*—Sharon Payne
(74) *Attorney, Agent, or Firm*—Morgan & Finnegan, LLP

(57) ABSTRACT

The present invention relates to a reflector which provides for good ventilation of a light source located in the said reflector and facilitates the passage of the reflector on production lines for the purpose of covering an internal surface of the reflector with powder. To this end, there is proposed according to the invention a reflector in which a reflector and a lamp holder are produced separately, prior to being interlocked. The reflector produced thus comprises a set of supports which are arranged such that a light source subsequently fitted in the reflector can be ventilated in a satisfactory manner. The lamp holder is interlocked with the reflector on the supports by means of centering pins and assembly studs.

16 Claims, 2 Drawing Sheets

REFLECTOR DEVICE FOR AUTOMOBILE VEHICLE HEADLIGHT

The present invention relates to a reflector device for headlights fitted on motor vehicles which provides for enduring use of a headlight and renders the reflectors highly manageable during their production.

The basic object of the invention is to propose a special reflector device embodiment which, in particular, permits the provision of good ventilation for a light source located in the said reflector device, and which permits handling on production lines, limiting the risk of damage to a reflective surface of a reflector device.

The general field of the invention is that of motor vehicle headlights. Known within this field are different types of headlight which include, basically:

- parking lights, having a low light intensity and a short range;
- lower-beam, or dipped-beam, lights, having a greater light intensity and a road range in the region of 70 metres, which are used, essentially, at night and whose light beam distribution is such that it does not dazzle the driver of a met vehicle;
- long-range main-beam lights, and long-range type additional lights, whose zone of vision on the road is in the region of 200 metres and which must be extinguished upon meeting another vehicle so as not to dazzle its driver;
- fog lights.

The reflector device according to the invention may be used equally for any of these headlights. It is to be described with particular reference to so-called elliptical headlights, in which a projection lens is used, but it could also be included in the production of parabolic headlights, in which no projection lens is used.

The various types of headlight all use a light source in combination with a reflector. An exemplary headlight having a reflector device used according to the prior art is shown in FIG. 1.

In this figure, an elliptical type headlight 100, i.e., in which a projection lens 103 is used, comprises two main portions: a first portion 101 is comprised of the lens 103 and of a lens support 104. A second portion 102 is comprised of a reflector device according to the prior art. The reflector device 102 is comprised of a single part which simultaneously performs the functions of reflector, at a rounded portion 105, and of lamp holder, at a rear end 106. The function of the reflector 105 is to reflect light signals produced by a light source located in the core of the rounded portion so as produce a light beam which meets the requirements imposed by different standards. The function of the lamp holder 106 is to hold the light source in an appropriate position within the reflector 105.

The junction between the lamp holder 106 and the reflector 105 is realized by a cylindrical element 107. According to the prior art, the cylindrical element 107 is closed: its lateral portion does not have any opening since, in order to provide openings, the mould used for producing the reflector device would have to use mould slides, and would be too complex and expensive to make for production of this part; moreover, the base (at the lamp holder 106) and the top (at the reflector 105) of the cylindrical element 107 are, at least substantially, obturated by different portions of the light source inserted in the reflector 105.

The fact that the cylindrical element 107 is closed, particularly on its lateral portion, presents a first problem: the reflector device 102 is not sufficiently ventilated, and this can be detrimental to prolonged proper functioning of the light source when it is illuminated; the temperature actually increases very rapidly in the reflector device 102, and may be sufficient to destroy the light source.

A second problem encountered with the reflector devices according to the prior art is illustrated in FIG. 2. This figure shows a vertical section through the reflector device 102. An internal surface 201 of the reflector 105 is thus represented. The cylindrical element comprises, in particular, an external wall 202, which was shown in FIG. 1, and an internal wall 203. The internal wall 203 likewise constitutes a closed cylinder. During production of the reflector devices 105, it is necessary to cover the internal surface 201 of the reflector 105 with a powder which will be transformed into a reflective lacquer. It is therefore necessary to move the reflector device 102 on production lines, and to hold it in position so that the internal surface 201 can be sprayed. According to the prior art, one or more hooks 204 are used. The problem is that, due to the cylindrical, closed character of the internal wall 203, the hooks 204 have to hold the reflector device 102 in position at an end 205 of the internal surface 201, risking damage to the latter. The internal surfaces of the reflector are actually precisely calculated and should be subjected to as few subsequent stresses as possible, and covered with a lacquer surface that is as homogeneous as possible.

The device according to the invention solves the two main problems described above. In general terms, there is proposed according to the invention a reflector device which, on the one hand, provides for good ventilation of a light source located in the reflector device and, on the other hand, facilitates the passage of the reflector device on production lines for the purpose of covering an internal surface of the reflector with powder. One of the advantages of the reflector device according to the invention is that it can still be produced by means of moulds, without subsequent machining operations on the moulded parts, which would risk damaging the internal surface of the reflector. Moreover, the moulds used can still be of a simple design, i.e., in particular, without mould slides.

To this end, there is proposed according to the invention a reflector device in which a reflector element and a lamp holder element are produced separately, prior to being interlocked. The reflector element produced thus comprises a set of supports which are arranged such that a light source subsequently fitted in the reflector device can be ventilated in a satisfactory manner. The lamp holder element is interlocked with the reflector element on the supports by means of centering pins and assembly studs.

The invention thus relates, basically, to a reflector device for a motor vehicle headlight, the reflector device having a reflector element which comprises an internal reflective surface, an external surface, and an opening on a rear portion of the reflector element for the insertion of a light source, characterized in that the reflector device comprises a lamp holder element which is interlocked with the reflector element by means of a set of supports, the said supports being arranged so as to create an open space between the lamp holder element and the reflector element. At least one of the said supports preferably bears on a base (311) of the reflector element (301), the said base (311) being distinct from the external surface (309) of the reflector element (301).

The device according to the invention may furthermore have one or more of the following features:

- the reflector element and the set of supports are made of the same material and during the same moulding operation;
- the set of supports is comprised of at least two support columns, for example, three support columns;

the support columns have a first end for holding the lamp holder element in position, and a second end which at least partially matches the shape of the external surface of the reflector element;

the second end of at least one support column is elongated to bear on a base of the reflector element, the said base being distinct from the external surface of the reflector element;

the base of the reflector element is contained in an output-end plane of the reflector device;

at least one support column comprises a central reinforcement element;

at least one support column comprises an interior reinforcement element;

a first column and a second column have an elongated shape, respectively defining a first support plane and a second support plane of the lamp holder element, the first support plane and the second support plane overlapping;

a third column has an elongated shape, defining a third support plane of the lamp holder element, the third support plane being perpendicular to the first support plane;

the interlocking of the lamp holder element and reflector element is permanent;

the first end of each support comprises a positioning pin which is intended to be inserted in an opening provided for this purpose in the lamp holder element;

the first end of each support comprises a centering and retaining stud which is intended to be inserted in an opening provided for this purpose in the lamp holder element, the lamp holder element being held in position by snapping of the centering and retaining stud on to the lamp holder element;

the reflector element and the set of supports are made from aluminium or from an aluminium-based alloy (the reflector element, in particular, may also be of plastic, thermoplastic or thermosetting material);

the lamp holder element is made from an alloy of zinc and aluminium, or from a zinc-and-aluminium-based alloy.

The invention also relates to a motor vehicle equipped with a reflector device including one of the aforementioned features.

The invention and its various applications will be best understood through reading of the following description and study of the accompanying figures, the latter being purely illustrative and not in any way limiting the scope of the invention, wherein:

FIG. 1, already described, shows a perspective view of a projector device according to the prior art;

FIG. 2, already described, shows a sectional view of a reflector device according to the prior art;

Figure 3:
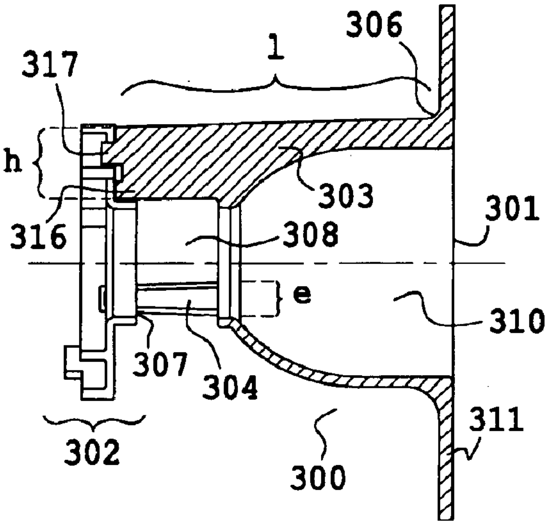
FIG. 3 shows a vertical section through a reflector device according to the invention.
Figure 4:
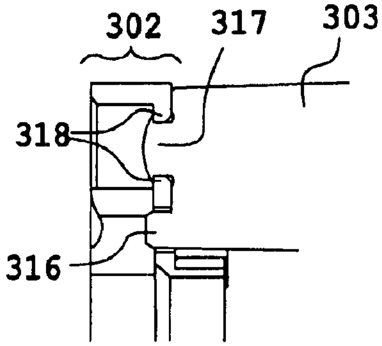
FIG. 4 shows a detail of a fastening means between two elements of the reflector device according to the invention.

In the various figures, the same references are maintained for those elements which are common to several figures. FIG. 3 shows a vertical section through a reflector device 300 according to the invention which is comprised, in particular, of a reflector element 301 and of a lamp holder element 302. The lamp holder element 302 and the reflector element 301 comprise, respectively, a first opening 314 and a second opening 315 (shown, in particular, in FIG. 6), provided to leave a gap intended for the fitting of a light source. A first support element 303, hatched in FIG. 3 because it is located in the sectional plane, and a second support element 304 are shown in this figure. The support elements, which are to be termed columns, are of an elongated shape, i.e., they are of a length l which is markedly greater than their height h which, in a particular example, are of the order of 60 millimetres and 15 millimetres respectively; the thickness e of these columns is of the order of 2 millimetres at a first end 307, termed the fastening end, and of the order of 5 millimetres at a second end 306, termed the shaped end.

Figure 5:
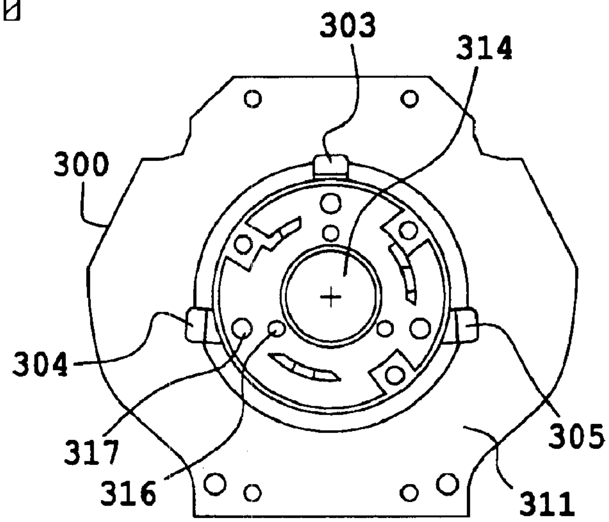
FIG. 5 shows a rear view of the reflector device according to the invention.

In the example illustrated, the reflector device 300 comprises a third column 305, shown in FIG. 5. The third column 305 cannot be seen in FIG. 3 because it is in alignment with the second column 304, i.e., the planes, termed support planes, containing the surfaces which constitute the height of each of these columns overlap. As can be seen from FIGS. 3 and 5, the first column 303 defines a plane containing a surface which constitutes its height, the said plane being perpendicular to the support planes of the second column 304 and of the third column 305. This arrangement of the columns constitutes an excellent means of discrimination upon assembling together the reflector element 301 and the lamp holder element 302, a single assembly position being possible. It is possible, however, to realize other means of discrimination in the assembling together of the reflector element 301 and the lamp holder element 302.

The arrangement of the support columns is such that creates an empty space 308 between these columns and between the lamp holder element 302 and the reflector element 301. In other words, between any two columns there is an opening which allows fluid, particularly air, to circulate between the exterior of the reflector device 300 and a space included between the reflector element 301 and the lamp holder element 302. The cylindrically shaped element 107 of the prior art has disappeared, and has been replaced by a system of fastening the lamp holder element 302 using support columns. Such openings permit optimum ventilation of a light source inserted in the reflector device 300.

Figure 1:
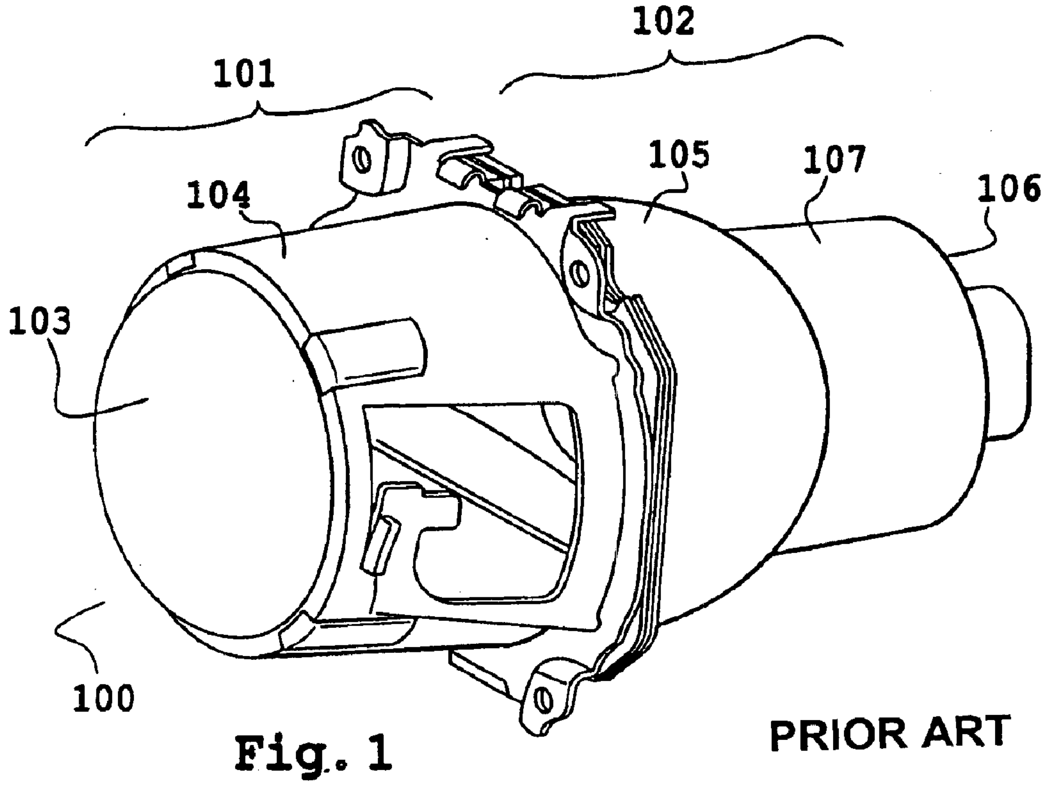
Fig. 1 PRIOR ART
Figure 2:
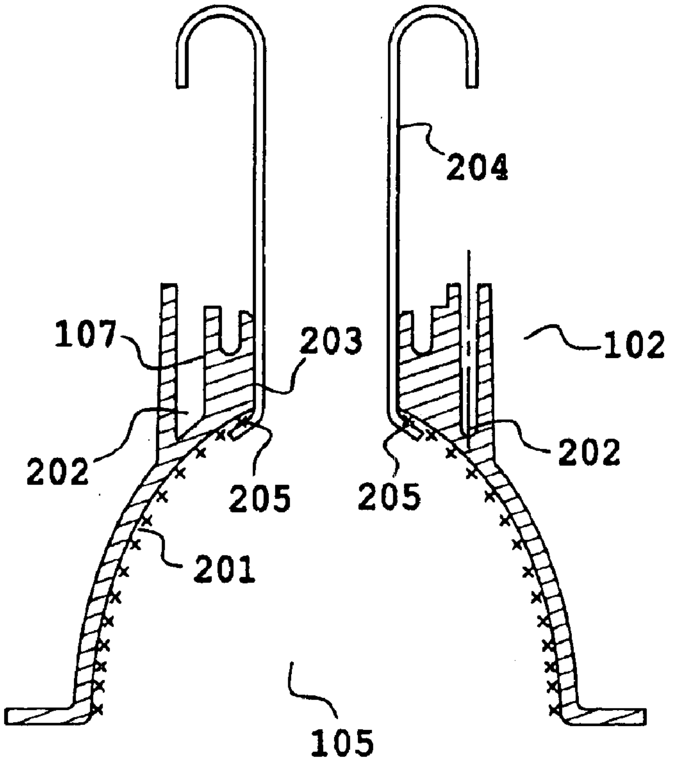
Fig. 2 PRIOR ART
Figure 6:
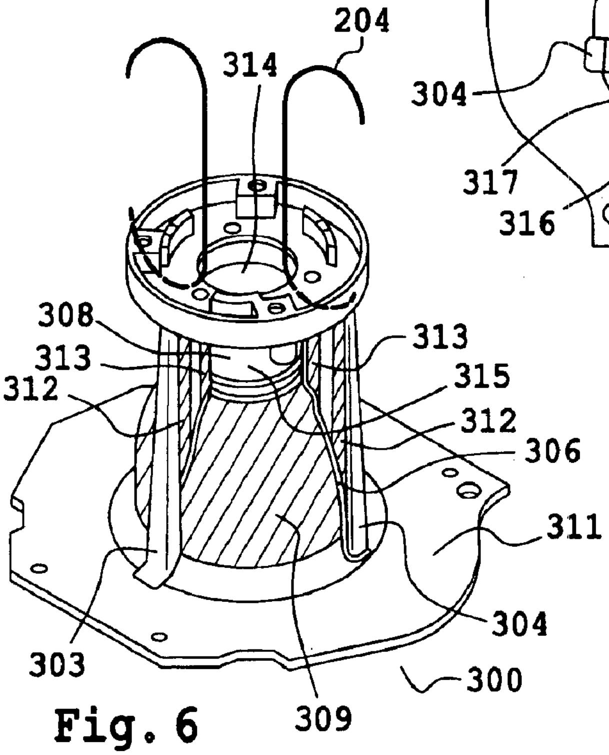
FIG. 6 shows a perspective view of the reflector device according to the invention.

The shaped end 306 of each column matches the shape of an external surface 309 of the reflector element 301, as shown in FIG. 6. This enables all the pressure forces that could be exerted on the different columns to be distributed over a maximum surface area of the reflector element, thus limiting the risks of deformation of an internal surface 310, termed the photometric surface, intended to reflect the light signals produced by the light source fitted in the reflector device. In an improved embodiment, the shaped end 306 of at least one support column terminates at a surface 311 used for mounting a lens support of the type shown in FIG. 1. The surface 311 is termed the base of the reflector element 301. It does not constitute the back of the reflective internal surface 310. In the example illustrated, this base 311 is disposed in an output-end plane of the light beam outside the reflector device 301. Such an embodiment provides for further limitation of the stresses that could damage the internal surface 310 of the reflector element 301.

One or more support columns may, moreover, comprise one or more reinforcement elements. Such reinforcement elements are indicated by hatching in FIG. 6: this figure shows, on the columns 303 and 304, a central reinforcement element 312, located approximately in the centre of each column, and an interior reinforcement element 313, located close to the openings 314 and 315 provided for insertion of the light source. The reinforcement elements 312 and 313 are realized by protuberances on the support columns. They serve, on the one hand, to limit the stresses that could damage the internal surface 310 of the reflector element 301 and, on the other hand, to discharge by convection a portion of the heat generated by the light source.

The lamp holder element 302 is of a circular shape and is capable of receiving within its depth an annular element, serving as a holder for the light source, which is fixed in position in the lamp holder element by, for example, a rotational movement. According to the invention, in order to retain the use of simple moulds and avoid the addition of machining operations, the lamp holder element 302 and the reflector element 301, including the support columns, are made in different moulds. This method of producing the reflector device according to the invention additionally enables these two elements to be made from different materials. In one exemplary embodiment, the reflector element 301 and the support columns are made from aluminium, the lamp holder element being made from an alloy of zinc and aluminium. Other metals, alloys or plastic materials may also be used for making these parts, it being possible to make the reflector element, in particular, from a thermosetting material or a thermoplastic material.

The lamp holder element 302 and the reflector element 301 are interlocked at the fastening ends 307 of the different support columns. In the example under consideration, each of these ends comprises a positioning pin 316 of a light source, which will be located in the lamp holder element 302, and a centering and retaining stud 317. The positioning pin 316 serves to correctly position the light source in relation to the internal surface 310 of the reflector element 302. Each centering and retaining stud 317 is intended to be inserted in a specific opening of the lamp holder element 302. The pin is included so that there is zero free motion, or virtually zero free motion, between a support column and the lamp holder element. Specific openings are also provided in the lamp holder element 302 for receiving each positioning pin 316.

Once each centering and retaining stud 317 and each positioning pin 316 have been inserted in their respective openings, a snapping operation is performed. This operation consists in deforming the end of each centering and retaining stud 317 in order to compress it on to the retaining elements 318 provided around each opening intended to receive a retaining stud. Such a mechanism for interlocking of the lamp holder element 302 and reflector element 301 effects a permanent joining of these two parts. Separation of these two parts would necessarily involve damage to at least one of the elements.

A further advantage inherent in the structure of the reflector device according to the invention is that the hooks 204, which are present on the production lines, can now grip in the openings 308, and thus no longer damage the internal surface 310 of the reflector element 301.

In conclusion, the reflector, including the lamp holder, according to the invention is highly advantageous, particularly since the studs on to which the lamp holder is snapped preferably bear on the front face of the reflector, with the result that there is no (less) deformation of the latter during assembly. The reflector and the lamp holder are preferably made of metal (aluminium or aluminium alloy). This highly conductive material, in combination with the type of studs already described ("radiator fins") promotes a satisfactory discharge of the heat.

What is claimed is:

1. A reflector for a motor vehicle headlight, the reflector having a reflector element which comprises an internal reflective surface, an external surface, and and an opening on a rear portion of the reflector element for the insertion of a light source, the reflector device comprises a lamp holder which is interlocked with the reflector by a set of supports, the set of supports being arranged so as to create an open space between the lamp holder and the reflector, at least one of the set of supports bearing on a base of the reflector, said base being distinct from the external surface of the reflector.

2. A reflector according to claim 1, wherein the reflector and the set of supports are made of the same material and during the same moulding operation.

3. A reflector according to claim 1, wherein the set of supports comprises at least two support columns.

4. A reflector according to claim 1, wherein the set of supports comprises three support columns.

5. A reflector according to claim 3, wherein the support columns have a first end for holding the lamp holder in position, and a second end which at least partially matches the shape of the external surface of the reflector.

6. A reflector according to claim 5 wherein the second end of at least one support column is elongated to bear said base of the reflector, said base being distinct from the external surface of the reflector.

7. A reflector according to claim 6, wherein the base of the reflector is contained in an output-end plane of the reflector.

8. A reflector according to claim 3, wherein at least one support column comprises a central reinforcement element.

9. A reflector according to claim 3, wherein at least one support column comprises an interior reinforcement element.

10. A reflector according to claim 3, wherein a first column and a second column have an elongated shape, respectively defining a first support plane and a second support plane of the lamp holder, the first support plane and the second support plane overlapping.

11. A reflector according to claim 10 wherein a third column has an elongated shape, defining a third support plane of the lamp holder, the third support plane being perpendicular to the first support plane.

12. A reflector according to claim 11, wherein the interlocking of the lamp holder and the reflector is permanent.

13. A reflector according to claim 5, wherein the first end of each support column comprises a positioning pin receivable in an opening in the lamp holder.

14. A reflector according to claim 5, wherein the first end of each support column comprises a centering and retaining stud receivable in an opening in the lamp holder, the lamp holder being held in position by snapping of the centering and retaining stud on to the lamp holder.

15. A reflector according to claim 14, wherein the reflector and the set of supports are made from aluminium or from an aluminium-based alloy.

16. A reflector according to claim 15, wherein the lamp holder is made from an alloy of zinc and aluminium, or from a zinc-and-aluminium-based alloy.

* * * * *

UNITED STATES PATENT AND TRADEMARK OFFICE

CERTIFICATE OF CORRECTION

PATENT NO. : 6,863,426 B2
DATED : March 8, 2005
INVENTOR(S) : Jean-Francois Delourme It is certified that error appears in the above-identified patent and that said Letters Patent is hereby corrected as shown below:

Column 6,
Line 7, delete "and";
Line 9-10, delete "device comprises" and insert -- further comprising --.

Signed and Sealed this

Twenty-fourth Day of May, 2005

JON W. DUDAS
*Director of the United States Patent and Trademark Office*